3,183,153
BLASTICIDIN-S ADDITION PRODUCTS AND
THEIR MANUFACTURING PROCESS
Yusuke Sumiki, Hamao Umezawa, Kazuo Fukunaga, Hiroshi Yonehara and Hideo Kubo, Tokyo, Shigeo Fujita, Kanagawa-ku, Yokohama-shi, Kanagawa-ken, Shiro Shirato and Kotaro Takaga, Tokyo, Masaji Kato, Ashigara-kami-gun, Kanagawa-ken, and Shinichiro Esumi and Tadao Ono, Tokyo, Japan, assignors to Zaidan-Hojin Nihon Kosei Busshitsu Gakujyutsu Kyogikai and Kaken Kagaku Kabushiki Kaisha, Tokyo, Japan, a corporation of Japan
Filed June 5, 1961, Ser. No. 114,895
Claims priority, application Japan, June 9, 1960, 35/27,097, 35/27,098, 35/27,099
2 Claims. (Cl. 167—65)

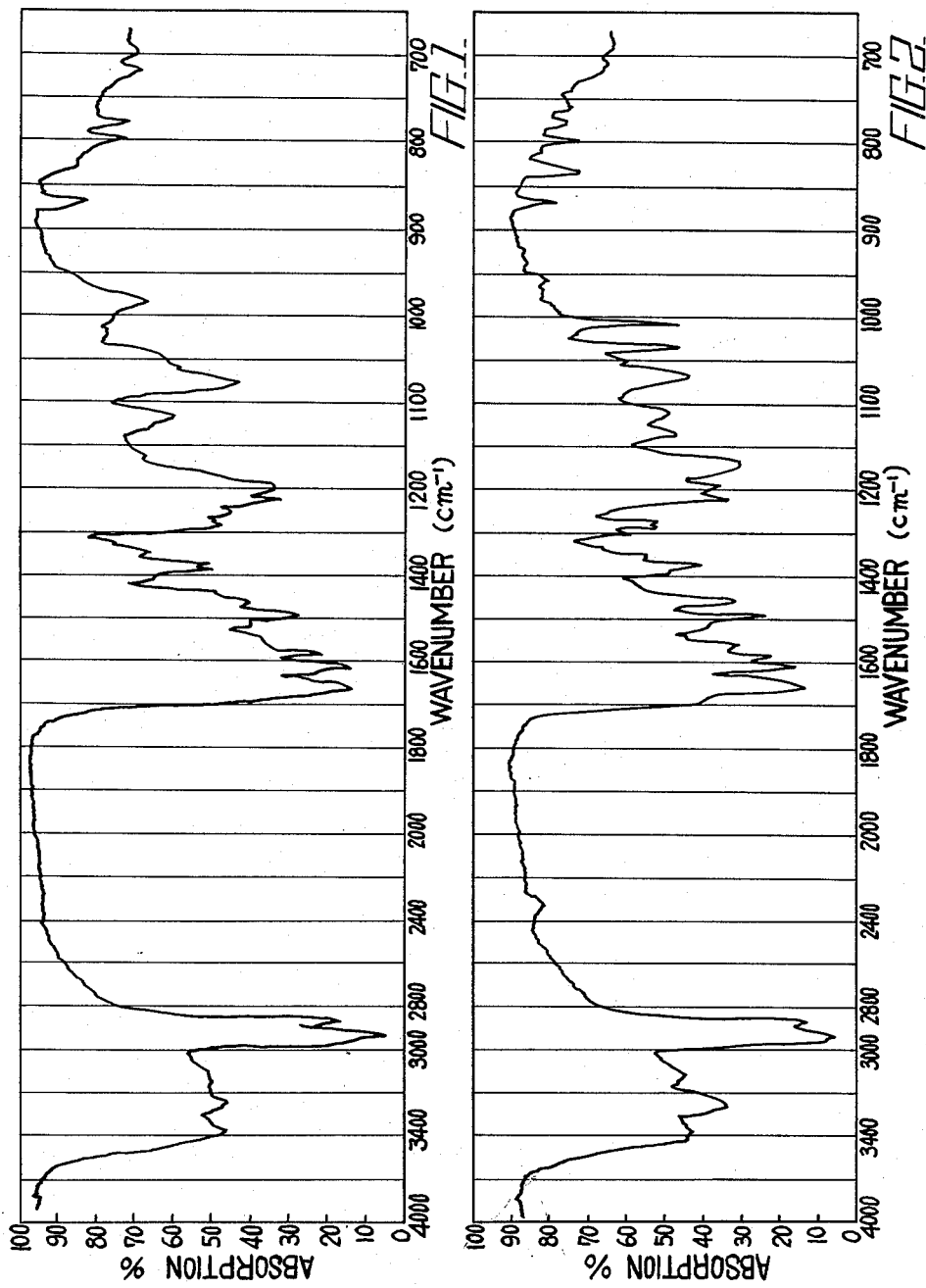

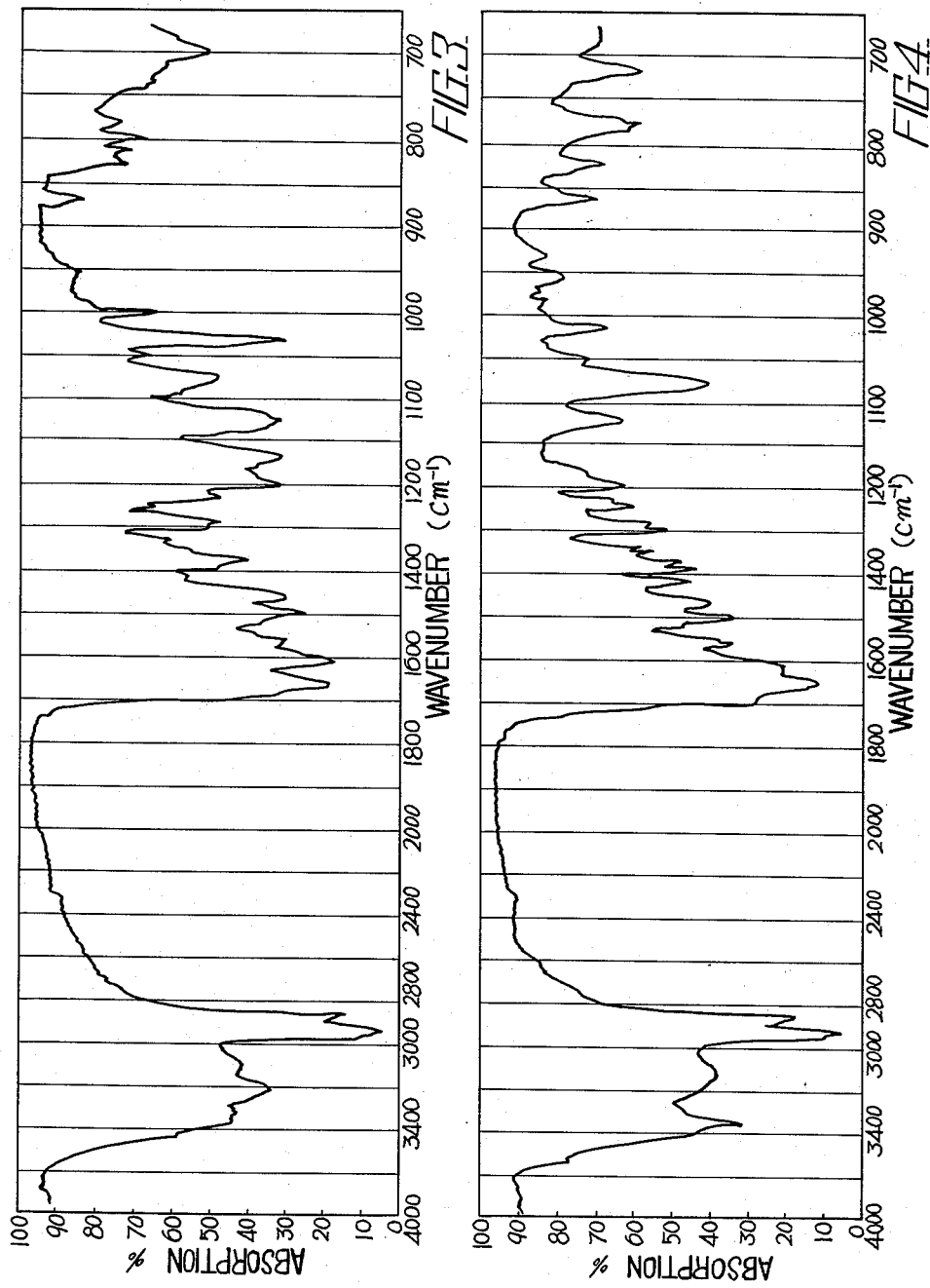

The present invention relates to a process for the production of agricultural chemicals including as a principal constituent Blasticidin-S, an antibiotic substance against phytopathogenic fungi. More characteristically speaking, it is a process wherein the Blasticidin-S, producing strain, such as *Streptomyces griseochromogenes* Fukunaga (ATCC No. 14511) or *Streptomyces albus* var. *pathocidicus* (ATCC No. 14510) is cultivated at an appropriate condition and, thereafter, precipitants for basic substances are added directly to the resulting culture broth filtrate or to extracts from methacrylic acid type cation exchange resins.

Blasticidin-S (abbreviated as B-S in the following) is originally the antifungal and antibacterial substance which has first been isolated in crystalline form by Yusuke Sumiki, Hiroshi Yonehara et al., and which has been reported (in the Journal of Antibiotics, Ser. A XI, No. 1, 1958) of its remarkable autibotic property, especially against *Piricularia aryzae*, Pseudomonas species, showing the characteristic properties as described later.

Blasticidin-S producing strains are reported also as follows:

*Streptomyces griseochromogenes* Fukunaga (the Journal of Antibotics, Ser. A, vol. XI, No. 1, January 1958), and *Streptomyces albus* var. *pathocidicus* (presented at the meeting of Nippon Nogei Kagaku Kai (i.e. the Agricultural Chemistry Society of Japan) held April 1961 by J. Nagatsu, K. Anzai and Y. Sumiki).

Blasticidin-S free base is a white needle crystal, melting at 235 to 236° C. under decomposition. The stability of B-S in aqueous solution at varying pH values was examined at 100° C. and found that it shows the highest stability at pH 5.0 to 7.0 and less stability at pH 4.0 as compared with cases of pH 2.0 and pH 8 to 9. The free base of Blasticidin-S is soluble in water and acetic acid, but insoluble in methanol, ethanol, acetone, benzene, ether, ethyl acetate, butyl acetate, chloroform, carbon tetrachloride, methyl ethyl ketone, cyclohexane, xylene, tetrahydrofuran, methyl isobutyl ketone, pyridine and dioxane. It is negative in ferric chloride, Fehling, Tollens, sodium nitroprusside, triphenyl tetrazonium chloride, bromonitroso, maltol, millon, Ehrlich, Sakaguchi, Moliseh, biuret, xanthroprotein and Graf's ketone, but positive in diazo, 2,4-dinitrophenylhydrazine, Graf's aldehyde, ammoniacal silver nitrate and ninhydrin.

Decomposition point of Blasticidin-S hydrochloride is 224 to 225° C. That of the picrate is 200 to 202° C., and the helianthate is 224 to 225° C. Optical rotation of the free base $[\alpha]_D^{11°} = +108.4$ (c.=1% in water). The measured value of the molecular weight of Blasticidin-S were 356.36 by titration equivalent with perchloric acid, 355.8 by the analysis of the double salt with platinum chloride and 300 to 450 by Berger-Akiya method.

Elementary analysis of Blasticidin-S—Calc. for $C_{14}H_{20}O_5N_6$ (M.W. 352): C, 47.22; N, 23.85. Found: C, 47.11; H, 5.83; N, 24.46.

The ultraviolet absorption spectrum absorption maximum is $$E_{1\ cm.}^{1\%} \ 349 \ at \ 275 \ m\mu$$

in N/10 hydrochloric acid and in case of N/10 sodium hydroxide its value is $$E_{1\ cm.}^{1\%} = 266 \ at \ 266 \ to \ 270 \ m\mu$$

Infrared absorption bands are observed in the following wave numbers: 2318, 3130, 2860, 1675, 1614, 1600, 1557, 1492, 1422, 1400, 1353, 1300, 1282, 1235, 1200, 1111, 1067, 1042, 1002, 943, 860, 822, 775, 714 cm$^{-1}$.

Quantitative determination of B-S: Biological assay method due to *Bacillus cereus* IAM 1729 is used. As a standard for activity, a high purity Blasticidin-S crystals (1000 u./mg.) are used.

Biological activities of Blasticidin-S were examined by the agar streak dilution method and the broth dilution method, the results are shown in Table I.

TABLE I.—ANTIBIOTIC SPECTRUM

| Test organisms: | Growth inhibition, mcg./ml. |
|---|---|
| Bacillus subtilis | 50 |
| Bacillus lactis | >100 |
| Escherichia coli | 50 |
| Pseudomonas fluorescens | 5 |
| Mycobacterium tuberculosis ATCC 607 | 50 |
| Penicillium notatum | >100 |
| Penicillium chrysogenum Q 176 | >100 |
| Aspergillus oryzae | >100 |
| Candida albricans | >100 |
| Saccharomyces cerevisiae | >100 |
| Torula utilis | >100 |
| Piricularia oryzae | 5–10 |
| Sclerotinia mali | 10 |
| Sclerotinia araclidis | >100 |
| Bacterium citri | 5 |
| Bacterium aroideae | 5 |
| Pseudomonas tabaci | 5 |
| Xanthomonas citri | 50 |
| Alternaria kikuchiana | 50 |

Effect of the B-S against *Piricularia oryzae* has been studied and found that the B-S is equivalent to mercuric preparation, for instance, phenyl mercuric acetate having hitherto been used in a strain examination, and possesses a remarkable therapeutic effect. As a result, the B-S has come to be used practically as antibiotics for *Piricularia oryzae* infection. The B-S preparations having hitherto been provided are B-S free base or its acid salts, which are soluble in water and strongly toxic towards human bodies and vegetables and accordingly show various practical disadvantages as agricultural chemicals.

The primary object of this invention is to provide the new B-S preparations which show less toxicity and high effectiveness as agricultural chemical. The usual methods adopted for the manufacture of B-S preparations are not suitable for the manufacture of agricultural chemicals, which should be low cost, since those methods are complicated and on a laboratory scale as described in the above-cited literatures.

A second object of the present invention is to produce B-S preparations at high yields and in conditions especially advantageous for mass production. In order to accomplish the first object referred to above, the present inventors have conducted investigation on the following chemicals shown in Table II for the purpose of making above-mentioned B-S preparations slightly soluble in water, without reducing therapeutic effects of agricultural chemicals. From the result of investigations referred to above, it has been realized that B-S preparations and slightly soluble powders or crystalline addition compounds can be processed at high yield, which have been selected as an agricultural chemical having excellent effects.

3 examples of ultra-red absorption spectrum for Blasticidin-S are shown as below:

FIG. 1—B-S lauryl sulfate.
FIG. 2—B-S dodecyl benzene sulfonate.
FIG. 3—B-S benzylaminophenyl sulfonate.
FIG. 4—B-S.

Since the Blasticidin-S addition products possess reduced solubility, as shown in Table IV as compared with B-S, the former is remarkably easy to separate and prepare from culture solution filtrate or crude concentrated aqueous solution.

TABLE IV

| B-S add. product | Purity, u./mg. | Solubility in water (u./ml.) |
|---|---|---|
| Blasticidin-S | 1,000 | 20,000 |
| B-S dodecylbenzene sulfonate | 580 | 105 |
| B-S laurylsulfate | 630 | 235 |
| B-S benzylaminophenylsulfonate | 595 | 1,380 |

N.B. B-S in the filtrate was determined after dissolved in distilled water at 25° C. under shaking for 2 hours.

TABLE II

| Precipitates for basic substances | Quantity of precipitation | Appearance of precipitation | Purity in B-S potency, units/mg. |
|---|---|---|---|
| Sodium dodecylbenzene sulfonate | +++ | Powdery | 457 |
| Sodium dibutylnaphthalene sulfonate | +++ | Pasty | 501 |
| Sodium tetradecyl sulfonate | ++ | Powdery | 517 |
| Tergitol [1] | +++ | Pasty | 480 |
| Cresolsulfonic acid-formalin condensate | +++ | Gel powder | 367 |
| Caster oil, sulfate | + | Oily | 382 |
| Sodium dialkylbenzene sulfonate | ++ | Powdery | 346 |
| Sodium laurylsesquiphosphate | ++ | do | 330 |
| Sodium lauryl sulfate | +++ | Crystal | 462 |
| Dialkyl sulfosuccinate | + | Powdery | 699 |
| Calcium dinaphthylmethan disulfonate | ++ | Pasty | 354 |
| Sodium naphthalene sulfonate | | do | 346 |
| Higher fatty acid-methyltaurin condensate. | ++ | Powdery | 336 |
| Sodium cetyloleyl sulfate | ++ | do | 406 |
| Sodium benzylaminophenyl sulfonate | +++ | Crystal | 570 |
| Sodium dipropyl benzylaminophenyl sulfonate. | +++ | do | 520 |
| Sodium picrate | +++ | Yellow powder. | 496 |
| Sodium flarlamate | +++ | do | 366 |
| Methyl orange | +++ | Yellow orange powder. | 384 |
| Ammonium reineckate | +++ | Red purple powder. | 350 |
| Sodium picrolonate | + | Yellow powder. | 412 |
| Sodium pentachlorophenolate | +++ | White powder | 400 |
| Sodium patatoluol sulfonate | ++ | Pasty | 422 |
| Sodium β-naphthalene sulfonate | +++ | White powder | 450 |
| Sodium 2,4-dinitro-naphthal 7-sulfonate | +++ | Yellow powder | 430 |

[1] Sodium tetradecyl sulfate.

The results of experiments on precipitation due to various precipitants for basic substances are respectively shown in Table II.

Decomposition points and results of elementary analyses on several examples of *Blasticidin* addition products are shown in Table III.

Colorless needle crystalline B-S addition products can be separated by procedure as follows: B-S is reacted with sodium lauryl sulfate or sodium benzylamino-phenyl sulfonate in heated (about 60° C.) water solution and then the addition product is crystallized by cooling.

The amount of addition is from equivalent to double

TABLE III

| | Decomposition point, °C. | Analyses, percent | | | |
|---|---|---|---|---|---|
| | | Carbon | Hydrogen | Nitrogen | Sulfur |
| Blasticidin-S (B-S) | 235–236 | 47.11 | 5.83 | 24.46 | 0 |
| B-S lauryl-sulfate | 239–240 | 51.13 | 7.95 | 15.61 | 4.56 |
| B-S dodecyl-benzene sulfonate | 241–242 | 55.46 | 7.72 | 14.87 | 4.17 |
| B-S benzylamino-phenyl-sulfonate | 235–238 | 52.76 | 5.84 | 16.87 | 4.44 |
| B-S picrate | 200–202 | 41.34 | 4.18 | 22.24 | 0 |
| B-S helianthate | 224–225 | 49.25 | 5.93 | 20.47 | 2.52 | the content of B-S to accomplishing the precipitation of the addition products referred to above. When however, a large quantity of impurities of organic basic substances coexists, it is necessary to add the sulfate or the sulfonate somewhat in excess.

B-S addition products obtained by the investigation conducted by the present inventors have been found to be less toxic to rat ($LD_{50}$) than B-S as apparent from and of practical advantages as an agricultural chemical. The results of oral toxicity tests listed in Table V.

In order to accomplish the second object of this invention referred to above, first based on the result of investigations with respect to the enhancement of B-S productivity or high potency of the culture media of fermentation of B-S producing strain, good results were obtained particularly by the addition of embryo of corn, bran, or yeast, as the components of culture media with usually employed ingredients such as sugars, soybean powder, and inorganic salts. One example of the results of the experiments is shown in Table VII.

TABLE V

| Acid No. | Surface-active agent | B-S precipitated per mg. of surface-active agent, mg. | Antifungal value, u./mg. | Toxic to rat $LD_{50}$, mg./kg. |
| --- | --- | --- | --- | --- |
| 1 | Sodium alkyl benzene sulfonate | 0.87 | 426 | 57 |
| 2 | Sodium lauryl sulfonate | 1.18 | 470 | 39.5 |
| 3 | Sodium cetyl oleyl sulfate | 0.77 | 415 | 46.2 |
| 4 | Cresol sulfonic acidformalin condensate. | 0.47 | 381 | 38.0 |
| 5 | Sodium lauryl cesquiphosphate | 0.63 | 341 | 38.5 |
|  | Blasticidin-S crystal |  | 1,000 | 16.3 |

In addition, it has been recognized that since drug penetrates slowly into plant the durability of chemicals increases and further the toxicity against plant cells decreases remarkably. Particularly, B-S addition products with surface active agents have good spreading property to plant surface and consequently the efficiency of agricultural drugs, increases to show advantageous exceedingly in practical use.

The results of the therapentically examinations of B-S against the *Piricularia oryzae* infections are as shown in Table VI. Obvious superiority has been observed as compared with therapeutic effects of mercury preparations usually used.

*Test conditions.*—Rice plant cultivated in green house: average growth, 20–30 cm.; the amount of chemicals dusted, 15 ml./pot on a turntable by means of a 20 lb. spray gun; the atmospheric temperature at the time of dusting, 20.5° C.

TABLE VII

[Basal medium: Sugar 4%, soybean powder 3%, table salt 0.6%]

| | Addition to basal medium, embryo of— | | | B-S concentration, mcg./ml. | Ratio, percent |
| --- | --- | --- | --- | --- | --- |
| | Wheat | Bran | Yeast | | |
| Control 1 | 0 | 0 | 0 | 1,880 | 40 |
| Control 2 | 0 | 3 | 0.5 | 4,730 | 100 |
| 1 |  | 0.5 |  | 4,620 | 97 |
| 2 |  | 1.0 |  | 5,250 | 110 |
| 3 |  | 1.5 |  | 5,600 | 118 |
| 4 |  | 2.0 |  | 5,910 | 125 |

In the next place, as a process of isolating B-S, a process for the purification by the extraction due to ordinary active carbon and iron exchange resin, accompanied by alumina chromatography has been adopted. The result of experiments on the condition of simple purification of B-S from culture broth is shown in Table VIII.

TABLE VI

| Specimen | Concentration, p.p.m. | Total number of spots on the infected leaves (A) | Number of acute spots (B) | Ratio B/A | Therapeutic value, percent |
| --- | --- | --- | --- | --- | --- |
| 1. B-S lauryl sulfate | 10 | 154 | 12 | 7.8 | 91.2 |
| 2. B-S dodecylbenzene sulfonate | 10 | 228 | 45 | 19.7 | 77.9 |
| 3. B-S benzylaminophenyl sulfonate | 10 | 262 | 17 | 6.5 | 92.7 |
| 4. Phenyl mercuric acetate | 20 | 252 | 141 | 56.0 | 48.4 |
| 5. Not treated |  | 399 | 356 | 89.0 |  |

TABLE VIII

| Resin | Form | Adsorption amount, mg./R-H ml. | 0.5N-HCl elution rate in percent | Yield, mg./R-H gr. |
|---|---|---|---|---|
| Methacrylic acid type R—COOH | H | 109.0 | 76.0 | 83.0 |
| (Amberlite IRC-50)[1] | Na | 123.0 | 19.6 | 24.5 |
| Salicylic acid type $R\diagdown_{OH}^{COOH}$ | H | 58.8 | 80.4 | 47.2 |
| (Kaken resin)[2] | Na | 51.0 | 91.8 | 46.8 |
| Sulfonic acid type $R\diagdown_{OH}^{SO_3H}$ | H | 82.0 | [4] 15 | [4] 12.3 |
| (Duolite C-10)[3] | Na | 99.0 | [4] 15 | [4] 14.8 |
| Phenol type R—OH | H | 17.0 | 82.1 | 14.0 |
| (Duolite S-30)[3] | Na | 21.4 | 69.5 | 10.9 |

[1] Rohm & Haas Co. product.
[2] Kaken Chemical Co. product.
[3] Chemical Process Co. product.
[4] Maximum.

As apparent in the above-shown table, salicylic acid type and phenol type resins possess relatively good elution power, whereas the adsorption quantity of those resins are inferior to metacrylic acid type, and sulfonic acid type resin shows remarkably poor elution rate in dilute acid. In the present invention, the optimum pH with respect to adsorption is appropriate at 5 to 7 in view of stability of B-S. In carrying out this invention, it is preferable to preliminarily convert resin in H-form with sulfuric or hydrochloric acid then wash thoroughly with water and make the culture filtrate in the neighbourhood of neutrality. In this case, resins whose pH has been adjusted beforehand with phosphate buffer solution of pH 7 of H-form resin, about 50% of which has been changed to Na-form resin show no significant differences in adsorption from the former. While Na-form resins simply washed in water are remarkably bad in adsorption. As referred to above in the present invention, the condition of elution from B-S adsorbed resins is preferable to use 1.0–0.1 N-dilute acid, but in industry sulfuric acid or hydrochloric acid is used generally and preferably.

According to the present invention, as referred to above, low toxicity and excellent agricultural chemicals can be produced economically and advantageously, by enhancing yields due to the improvement of productivity of B-S during the cultivation process and by raising efficiency in the extraction process and simultaneously by making the product to be B-S additives slightly soluble in water.

Example 1

Micro-organisms of *Streptomyces griseochromogenes* Fukunaga, i.e. the producing strain for Blasticidin-S, are inoculated in a medium comprising 2% glucose, 1% peptone, 1% meat extract and 0.2% common salt, and cultured under agitation for about 48 hours. The culture just referred to is designated as a preliminary culture. The resulting precultured substance is then inoculated in a medium comprising 5% sugar, 3% defatted soy-bean powders, 2% embryo of wheat and 0.6% common salt, which has been prepared in a 600 litre fermentation tank, and cultured for approximately 24 hours at 29° C. The culture referred to following to the preliminary culture is designated as a second preliminary culture. The resulting substance is grafted in the above-mentioned medium contained in a 600 litre fermentation tank and subjected then to fermentation at 29° C. under agitation with aeration. Blasticidin-S is produced in 120 hours of fermentation, when the amount of production reaches maximum and the potency in the liquid arrives at 5700 mcg./ml. The fermented liquid is added with diatomaceous earth as filter aid and filtered and 4 kilolitres of transparent filtrate solution is adsorbed at 2.0 space velocity on 500 litres by volume in water of methacrylic acid type cation exchange resin amberlite TRC-50 H, and dissolved out with 0.5 N hydrochloric acid at flow rate of space velocity 0.3.

In 500 litres, eluate B-S contains 36.4 mg./ml., total activity of B-S: 18.2 kg., and its extraction yield showed 80%.

The crude B-S hydrochloride aqueous solution is adjusted at pH 6, heated at 40° C. and added with aqueous solution of 20 kg. sodium lauryl sulfate dissolved in 400 litres warm water, reacted under stirring and stood over night at cool place. Then crystals precipitated are separated and 40 kg. of dry crystal is obtained. The purity is 450 u./mg. and B-S preparations for *Pir. oryzae* is prepared from this substance after addition with suitable ingredients.

Example 2

Starting from the Blasticidin-S cultured broth, 5 litres crude B-S sulfate aqueous solution in 15 mg./ml. B-S concentration, extracted with methacrylic acid type cation exchange resin: Duorite CS-101, is adjusted at around pH 6, heated at 40° to 50° C. and added with aqueous solution of 85 gr. sodium alkylbenzenesulfonate dissolved in 1700 ml. water, vigorously stirred and stood in an ice chamber overnight; then amorphous precipitates formed are separated by filtration.

The dry matter yields at 150 gr. (B-S purity: 435 u./mg.).

Example 3

10 litres of 3500 mcg./ml. B-S culture solution filtrate is adjusted at pH 6, added with 50 gr. aqueous solution of sodium cetyl-oleyl sulfate, and stood overnight and then the precipitation formed is separated.

The yield as dry matter of B-S additive: 75 gr.; purity: 340 u./mg.

Example 4

15 litres crude aqueous solution containing 1.0 kg. Blasticidin-S hydrochloride is added with aqueous solution of 4 kg. sodium benzylaminophenyl sulfonate dissolved in 15 litres warm water, mixed and stood still over-night and filtered.

Unit in mother liquor: 120 u./ml.; total precipitated dry matter: 1.9 kg.; purity 430 u./ml.; yield: 94%.

What we claim is:

1. The process for preparing Blasticidin-S addition salts comprising contacting a Blasticidin-S containing broth with a methacrylic acid cation-exchange resin pre-adjusted at pH 5–7, to absorb Blasticidin-S on said resin, eluting said resin with 0.1 to 1.0 N dilute acid, then adding to the resulting eluate a surface-active agent containing an anion radical selected from the group consisting of sulfonate and sulfate to produce a difficulty water-soluble addition salt of said Blasticidin-S, and recovering the addition salt product.

2. The Blasticidin-S addition salt produced by the process of claim 1.

References Cited by the Examiner
UNITED STATES PATENTS 2,528,188  10/50  Taylor _____ 260—210
2,537,934   1/51  Lott _____ 260—210

OTHER REFERENCES

A Compilation of Culture Media for the Cultivation of Microorganisms, Levine, 1930, pages 192 (#686), 680 (#2100), 221–222 (#762), 769 (#2386), 770 (#2391), 689–690 (#2139).

Takeuchi et al.: J. of Antibiotics, Ser. A, January 1958, pages 1–5.

JULIAN S. LEVITT, *Primary Examiner.*

MORRIS O. WOLK, IRVING MARCUS, LEWIS GOTTS, *Examiners.*